Feb. 26, 1924.                                                          1,484,952
W. H. McSWAIN ET AL
AUTOMATIC FLOW FOR GLASS TANKS
Original Filed May 5, 1921    2 Sheets-Sheet 2

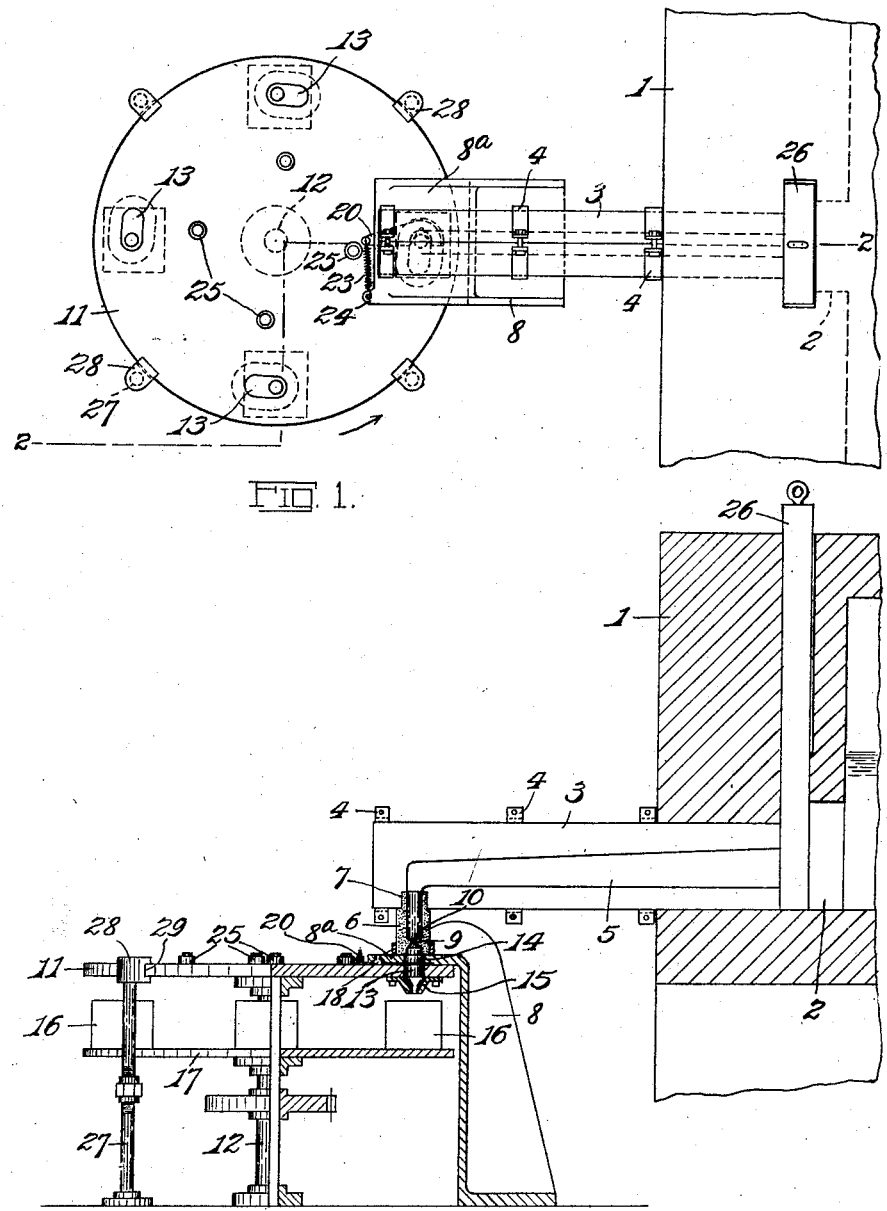

Inventors.
W. H. McSwain.
H. W. McSwain.
By H. E. Dunlap
Attorney.

Patented Feb. 26, 1924.

1,484,952

UNITED STATES PATENT OFFICE.

WILLIAM H. McSWAIN, OF MOUNDSVILLE, WEST VIRGINIA, AND HARRY W. McSWAIN, OF DETROIT, MICHIGAN.

AUTOMATIC FLOW FOR GLASS TANKS.

Application filed May 5, 1921, Serial No. 466,938. Renewed October 25, 1923.

*To all whom it may concern:*

Be it known that we, WILLIAM H. McSWAIN, and HARRY W. McSWAIN, citizens of the United States of America, and residents, respectively, of Moundsville, county of Marshall, and State of West Virginia, and Detroit, county of Wayne, and State of Michigan, have invented certain new and useful Improvements in Automatic Flows for Glass Tanks, of which the following is a specification.

This invention relates broadly to automatic charging devices for glass molds, and more particularly to an automatic flow and mold-charging apparatus.

The primary objects of the invention is to provide a mechanism for flowing glass from a tank and for automatically delivering such glass in charges of predetermined uniform size or quantity to molds arranged for the reception of the same.

A further object is to provide an apparatus of the character mentioned which shall be simple and inexpensive in its construction and efficient in its operation.

With these and other objects in view, the invention resides in the features of construction, arrangement of parts and combinations of elements which will hereinafter be fully described, reference being had to the accompanying drawings, in which—

Figure 1 is a top plan view of the invention;

Figure 2 is a sectional elevation, the section being taken on line 2—2, Fig. 1;

Figure 3:
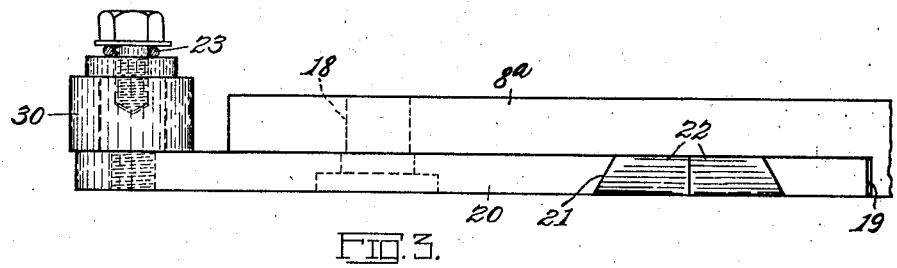
Figure 3 is an enlarged side elevation of the shear and the horizontal portion of the stand; and—

Referring to said drawings, 1 indicates a glass tank having a discharge passage or opening 2 in a wall thereof. Having one end adapted for communication with said passage is a spout 3 composed of a pair of complementally arranged slabs of suitable refractory material, said slabs being secured together as by means of clamps 4. The passage 5 of said spout is preferably more or less tapering in form, and adjacent to the outer end of said spout said passage communicates with the interior of a vertically disposed cylinder or conduit 6 which has a reduced upper end removably fitted in a socket 7 provided therefor in the under side of the forward end of said spout. Said conduit has its lower end seated upon the horizontal plate-like portion 8$^a$ of a stationary supporting stand 8.

The conduit 6 has an internal annular shoulder 9 located at a suitable distance from its lower end, whereby is formed a reduced throat 10 designed to restrict the rate of flow of the molten glass to the extent required, it being understood that it is the intention to employ a plurality of interchangeable conduits having throats 10 of different capacities to suit the various quantities of glass required in the production of charges for the formation of different articles of ware.

Disposed beneath the portion 8$^a$ of the stand 8 is the outer edge portion of a circular table 11 which is carried by a vertically disposed rotating shaft 12. A plurality of oblong openings 13 is provided in the said edge portion of said table, said openings being located at relatively-spaced intervals and being designed to be carried by rotation of the table into successive registration with an opening 14 which is provided in the plate portion 8$^a$ of the stand and which is permanently in register with the lower end of the passage in the conduit 6. Attached to the under side of the table in underlying relation to each opening 13 is a funnel 15 whereby charges of glass deposited therein are delivered to an underlying mold 16 carried by a second table 17 mounted on the shaft 12 at a suitable distance below said table 11.

Figure 4:
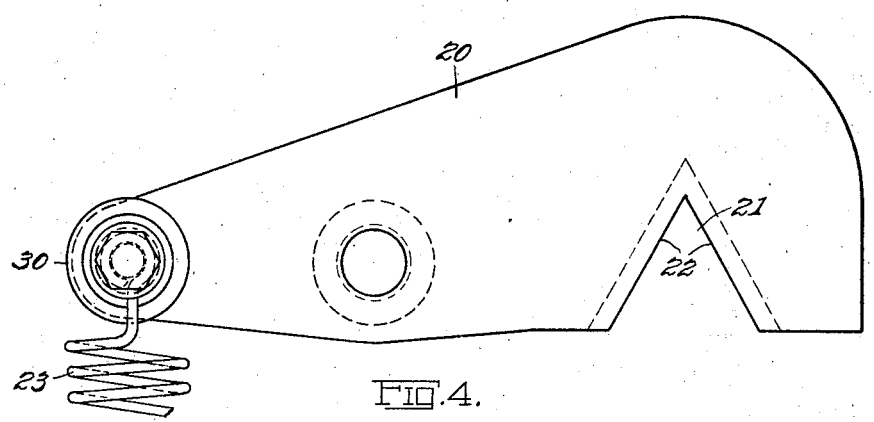
Figure 4 is an enlarged top plan view of the shear.

Mounted intermediate its ends upon a pivot-pin 18 carried by the plate 8$^a$ of the stand and having its main body portion operating in a recess 19 provided therefor in the under face of said plate is a thin blade or shear 20 designed for actuation at certain regular intervals in the rotation of the table 11 for shearing off charges of glass for delivery to the molds 16. As shown, said shear has its under face disposed flush with the under side of the plate 8$^a$ so as to closely overlie the table 11, and, when actuated, said shear cooperates with the closely overlying plate 8$^a$ for effecting the shearing from the vertically moving column of glass for detaching charges of the latter. Said shear has formed therein a recess 21 of V-shape with beveled cutting edges 22, as is best shown in Figs. 3 and 4. Said shear is normally held retracted, or in a position in which its shearing edges 22 are withdrawn with respect to the opening 14 in the plate 8ª, by means of a retractile coil spring 23 having one end attached to the projecting end of the shear and having its opposite end attached to a fixed part, as to the lug 24 of the stand 8. The said projecting end of the shear is adapted, in the rotation of the table 11, to be abutted successively by a plurality of anti-friction rollers 25 carried by said table, said rollers being positioned to engage said shear and to actuate the latter to swing on its pivotal mounting 18 against the tension of its spring 23 for effecting the shearing off of the glass which gravitates into the openings 13 and funnels 15. Said rollers 25 are so positioned that they actuate the shear to operate at substantially the instant when the midlength of the oblong openings 13 is in alinement with the axis of the opening 14.

In practice, the flow of the glass from the interior of the tank 1 through the passage 2 thereof is controlled by a suitable valve or closure, as the vertically movable closure 26. When said closure is elevated to open said passage, glass flows outward through the passage 5 of the spout 3 and gravitates therefrom through the conduit 6 and into the opening or passage 14 in the plate 8ª. When an opening 13 of the rotating table 11 comes into register with said passage 14, the glass gravitates into the opening 13 and the underlying funnel 15. Each of said openings is so proportioned in length with respect to the rate of flow permitted through the throat 10 of the conduit that the desired quantity of glass will have entered said opening by the time the middle, or midlength, portion of the latter alines with the passage 14, at which instant the shear is actuated, as aforesaid, for detaching the charge, which latter then gravitates through the funnel to the underlying mold 16. As shown, the upper end of said funnel is of oblong form to substantially conform to the opening 13 which it underlies, and the body of said funnel thence inclines to its discharge end which is in approximate vertical alinement with the forward end of said opening 13.

Suitable means is preferably provided whereby the table 11 may be maintained in a true horizontal plane, the means herein shown consisting of adjustable standards 27 surmounted by head-pieces 28 provided with recesses 29 in which the peripheral edge of the table is received.

The inner end of the shear preferably carries an anti-friction roller 30 with which the rollers 25 on the table engage for actuating said shear.

What is claimed is:—

1. An automatic flow for glass, comprising, in combination with a glass tank, a spout leading from said tank, a horizontal stand located beneath said spout and having a passage therethrough, a conduit interposed between said spout and said stand, said conduit having a reduced throat, a table rotatable beneath said stand and having a plurality of relatively spaced openings which are successively carried into register with said passage for receiving glass from the latter, and shears arranged to operate intermediate said stand and said table for detaching glass received by said openings, and means for actuating said shear at definite intervals.

2. An automatic flow for glass, comprising, in combination with a glass tank, a spout leading outward from said tank, a stationary horizontal stand having a passage therethrough, a vertically disposed conduit interposed between said spout and said stand and resting upon the latter, said conduit being in open communication at its upper end with the interior of said spout and at its lower end with said passage, a rotating table having a plurality of openings therein adjacent to its peripheral edge, said openings being located to be successively carried into vertical alinement with said passage and to receive glass by gravity from the latter, a shear intermediate said table and said stand, and means for actuating said shear at definite points in the travel of said table for detaching charges of glass.

3. An automatic flow for glass, comprising, in combination with a glass tank, a spout leading from the tank, a horizontal stand located beneath said spout and having a vertical passage therethrough, means for conducting glass from said spout to said passage, a rotating table having the edge portion thereof in closely underlying relation to said stand and having oblong openings in said edge portion, said openings being located to be successively carried by rotation of the table into register with said passage for receiving glass from the latter, a shear arranged for actuation intermediate said table and said stand, means normally maintaining said shear inoperative, and means for automatically actuating said shear to operate across the lower end of said stand-passage at a definite point in the registration of each table opening with said passage.

4. An automatic flow for glass, comprising, in combination with a glass tank, a spout leading from the tank, a horizontal stand located beneath said spout and having a vertical passage therethrough, means for conducting glass from said spout to said passage, a rotating table having the edge portion thereof in closely underlying relation to said stand and having oblong openings in said edge portion, said openings being located to be successively carried by rotation of the table into register with said passage for receiving glass from the latter, a shear, means for actuating said shear across the lower end of said passage at a definite point in the registration of each table-opening with said passage, a second table located beneath the first table and molds carried by the second table in position to receive charges of glass detached by said shear.

In testimony whereof we affix our signatures in presence of two witnesses.

WILLIAM H. McSWAIN,
HARRY W. McSWAIN.

Witnesses to signature of WILLIAM H. McSWAIN:
H. E. DUNLAP,
L. B. WOOD.

Witnesses to signature of HARRY W. McSWAIN:
A. B. BACON,
C. WIN JONES, JR.